US009543780B2

(12) United States Patent
Ho

(10) Patent No.: US 9,543,780 B2
(45) Date of Patent: Jan. 10, 2017

(54) MODULAR WIRELESS CHARGING STATION AND ASSEMBLY

(71) Applicant: DIGITECTURE INC., Kowloon Bay (HK)

(72) Inventor: Alvin Felix Ho, Kowloon Bay (HK)

(73) Assignee: Alvin Felix Ho, San Jose, CA (US)

( * ) Notice: Subject to any disclaimer, the term of this patent is extended or adjusted under 35 U.S.C. 154(b) by 26 days.

(21) Appl. No.: 14/307,964

(22) Filed: Jun. 18, 2014

(65) Prior Publication Data

US 2014/0368163 A1    Dec. 18, 2014

Related U.S. Application Data

(60) Provisional application No. 61/836,194, filed on Jun. 18, 2013.

(51) Int. Cl.
*H02J 7/00* (2006.01)
*H02J 7/02* (2016.01)
*H02J 5/00* (2016.01)

(52) U.S. Cl.
CPC .............. *H02J 7/025* (2013.01); *H02J 7/0027* (2013.01); *H02J 7/0042* (2013.01); *H02J 5/005* (2013.01); *H02J 7/0044* (2013.01); *H02J 7/02* (2013.01)

(58) Field of Classification Search
CPC ......... H02J 7/025; H02J 5/005; H04B 5/0075; H04B 5/0081; B60L 11/182; B60L 11/1829; H01F 38/14; Y02T 90/122
USPC ........................................................ 320/108
See application file for complete search history.

(56) References Cited

U.S. PATENT DOCUMENTS

| | | |
|---|---|---|
| 7,948,208 B2 | 5/2011 | Partovi et al. |
| 8,164,222 B2 | 4/2012 | Baarman |
| 8,245,843 B1 | 8/2012 | Wu |
| 8,248,024 B2 | 8/2012 | Yuan et al. |
| 8,283,812 B2 | 10/2012 | Azancot et al. |
| 8,362,744 B2 | 1/2013 | Terao et al. |
| 2007/0182367 A1 | 8/2007 | Partovi |
| 2011/0025263 A1 | 2/2011 | Gilbert |

(Continued)

FOREIGN PATENT DOCUMENTS

WO    WO2014205070    12/2014

OTHER PUBLICATIONS

Search History; Patent Cooperation Treaty Patent Application No. PCT/US2014/042929; International Publication No. WO2014205070; Conducted on Aug. 4, 2015; Dated Sep. 4, 2015.

(Continued)

*Primary Examiner* — Nghia Doan
(74) *Attorney, Agent, or Firm* — Hanrahan Law Firm, P.A.; Benjamin M. Hanrahan

(57) ABSTRACT

A modular wireless charging assembly is presented herein. In particular, the charging assembly comprises a plurality of wireless charging pads or bases disposed in removably interconnected relation with one another to provide a collective charging surface or interface. Particularly, each of the wireless charging pads or bases include a charging surface which is structured and configured to wirelessly charge an electronic device (e.g., a cellular telephone, mp3 player, PDA, game console, etc.) disposed thereon. The various wireless charging pads or bases include attachment assemblies which are structured to dispose adjacent wireless charging pads or bases in a removably interconnected relation with one another.

20 Claims, 8 Drawing Sheets

(56) References Cited

U.S. PATENT DOCUMENTS

| | | |
|---|---|---|
| 2011/0227527 A1 | 9/2011 | Zhu et al. |
| 2011/0241608 A1* | 10/2011 | Adamczyk .............. H02J 7/025 320/108 |
| 2012/0256585 A1* | 10/2012 | Partovi .................. H01F 5/003 320/108 |
| 2012/0268238 A1* | 10/2012 | Park ...................... G07F 15/006 340/5.8 |
| 2012/0295634 A1 | 11/2012 | Kim |
| 2013/0063873 A1 | 3/2013 | Wodrich et al. |

OTHER PUBLICATIONS

International Search Report; Patent Cooperation Treaty Patent Application No. PCT/US2014/042929; International Publication No. WO2014205070; Mailed on Sep. 4, 2015.

Written Opinion of the International Searching Authority; Patent Cooperation Treaty Patent 4pplication No. PCT/US2014/042929; International Publication No. WO2014205070; Mailed on Sep. 4, 2015.

International Preliminary Report on Patentability; Patent Cooperation Treaty Patent Application No. PCT/US2014/042929; International Publication No. WO2014205070; Issued on Dec. 22, 2015.

* cited by examiner

MODULAR WIRELESS CHARGING STATION AND ASSEMBLY

CLAIM OF PRIORITY/CROSS REFERENCE TO RELATED APPLICATION

The present application is based on and a claim to priority is made under 35 U.S.C. §119(e) to provisional patent application Ser. No. 61/836,194, having a filing date of Jun. 18, 2013, the contents of which are incorporated herein their entirety.

FIELD OF THE INVENTION

The present invention is generally directed to a modular wireless charging station and assembly comprising a plurality of removably interconnected charging bases configurable in a customized interconnected layout, size and orientation.

BACKGROUND OF THE INVENTION

Wireless power transfer, including for example, inductive wireless charging, inductive electric power transfer, electromagnetic induction, etc. implemented via the Qi interface standard or other protocols is growing at a rapid rate. Consequently, a number of electronic devices such as mobile phones, music or mp3 players, handheld game consoles, tablet computers, etc. include technology to support wireless power transfer. It should be noted that a number of other electronic devices can or may support wireless power transfer, including, but in no way limited to various home appliances such as electric kettles, rice cookers, toasters, blenders, slow cookers, pots and pans, etc.

However, many wireless power transfer stations are small and can only accommodate a defined number of electronic devices. As the number of electronic devices in a single household or office grows, and, as many people own or utilize more than one electronic device (e.g., a cellular telephone and a tablet computer), the need for larger, more versatile and customized wireless charging stations is desired.

In particular, it would be beneficial to have a charging station that is structured to allow for expansion or customized sizes and configurations. In this regard, an advantageous feature would allow a user to add or subtract tiles or pads to and from a given charging station and to expand or customize the size and configuration of a charging station to suit his or her specific size and spatial needs. In yet another embodiment, it would be beneficial for each of the pads or tiles to be operative independently, meaning each of the tiles or pads may disconnect from one another and be used alone, if desired.

SUMMARY OF THE INVENTION

The present invention is generally directed to a modular wireless charging station and assembly comprising a plurality of wireless charging pads, bases or tiles selectively disposed in a removably interconnected relation with one another. In particular, the pads or bases of certain embodiments are configured to provide power to or charge one or more electronic devices (e.g., cellular telephone, mp3 player, game console, etc.) via wireless charging technology, including, for example, inductive wireless charging, inductive electric power transfer, electromagnetic induction, etc. Accordingly, the bases or pads comprise a power transmitter and/or transmitting coil or module which is structured to provide or generate inductive power. Moreover, the electronic device(s) comprises a power receiver and/or receiving coil which is cooperatively structured to consume inductive power. Therefore, when an electronic device is disposed on or proximate to the charging or interface surface of the charging base or pad, the base or pad will provide inductive power via the power transmitter and charge the electronic device via electromagnetic induction or wireless power transfer.

The various charging bases or pads of the present invention further comprise attachment assemblies configured to allow interconnection there between and therefore allowing disposition of the bases into and out of an interconnected orientation and a separated, disconnected or independent orientation. Thus, a plurality of bases or pads may be interconnected with one another to generate a customized and collective charging station of virtually any shape, size and configuration.

Particularly, in one embodiment, the charging bases or pads comprise a plurality of side edges or surfaces, each of which include an attachment mechanism to interconnect with the side edges or surfaces of an adjacent base. As just an example, the bases may be in the form of a square or rectangle comprising four side edges. Each of the four side edges comprise attachment mechanisms structured to interconnect with adjacent bases, as desired. In this manner, the bases of one embodiment can connect to one another in a fully customized manner, similar to laying tile on a floor. It should be noted, however, that the various bases or pads of the present invention may be configured in virtually any shape or size.

In yet another embodiment, the bases may interconnect with one another to generate or construct a three dimensional, multi-layered, angled, and/or an at least partially vertically assembled or at least partially vertically aligned charging station comprising a bottom base, side bases and/or, in certain embodiments, a top base. Accordingly, the bases may interconnect with one another to create, for example, a box shaped charging station wherein electronic devices may be disposed within the box to receive power via the wireless or inductive charging described herein. As will be described herein, other embodiments includes a hinge-like attachment assembly allowing one or more side bases to be disposed in a customized incline relative to the bottom base. One or more of the side, bottom and/or top bases may also include at least one support structure which may, in one embodiment, comprise a pocket or ledge to support one or more electronic devices therein or thereon.

In yet another embodiment, the attachment assembly comprises at least one vertical supports structured to dispose one or more upper or top bases. Further, the attached assembly or vertical supports are structured to transmit or communicate power between the upper and lower bases thereof.

It should be noted that when disposed in a collected or interconnected configuration, power may be provided to a single one of the plurality of pads and then distributed to the other interconnected pads. However, in certain embodiments, each pad or base may be used independently and can therefore independently connect to an external power supply, or include a connected or internal power source such as a battery.

BRIEF DESCRIPTION OF THE DRAWINGS

Like reference numerals refer to like parts throughout the several views of the drawings.

DETAILED DESCRIPTION OF THE INVENTION

Figure 1:
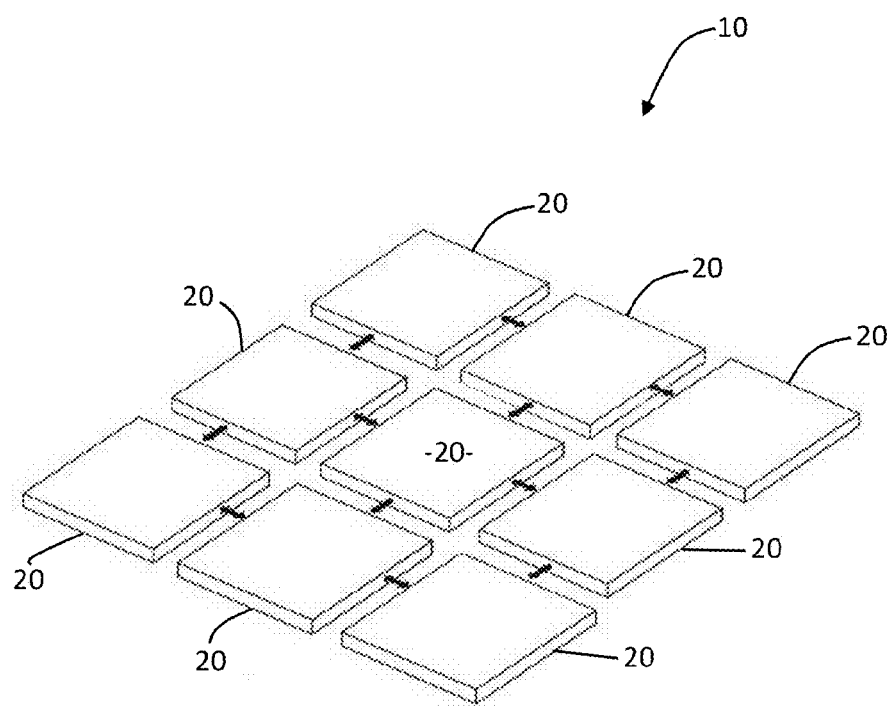
FIG. 1 is an exploded view of the wireless charging station and assembly disclosed in accordance with at least one embodiment of the present invention.
Figure 2:
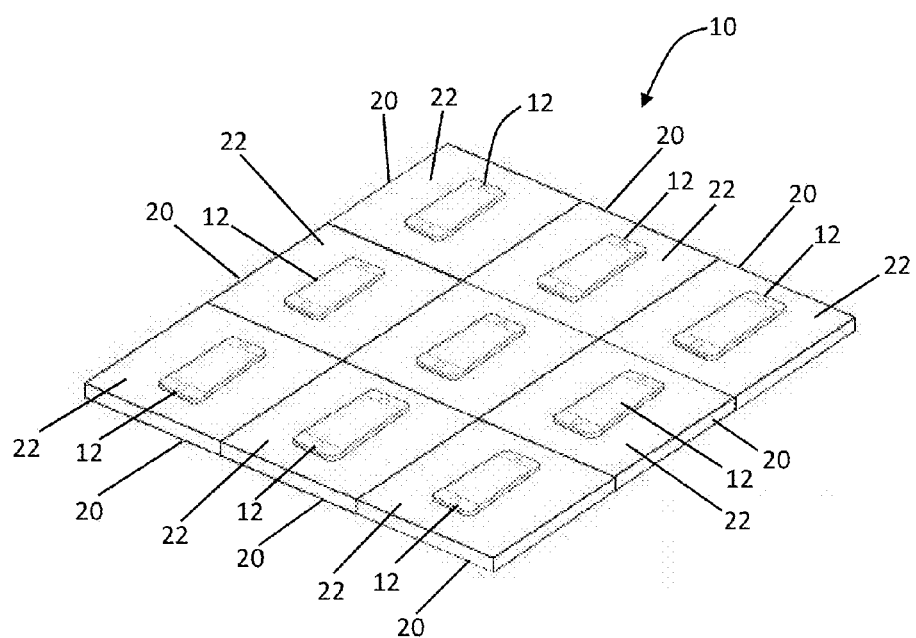
FIG. 2 is a schematic representation of the assembled wireless charging station and assembly illustrated in the embodiment of FIG. 1.

As shown in the drawings, and with particular reference to FIGS. 1 and 2, the present invention is directed to a modular wireless charging station and assembly, generally referenced as 10. In particular, as will be described herein, the charging station and assembly 10 of the various embodiments of the present invention comprises one or more charging pads or bases 20 which are disposable in a removably interconnected relation or orientation with one another, as generally indicated by internal arrows in FIG. 1.

In particular, as will become apparent from the discussion herein, each of the charging pads or bases 20 are structured and configured to provide temporary power to or otherwise charge one or more electronic devices 12 which are disposed or placed on or proximate a charging surface or interface surface, generally referenced as 22 (see FIG. 2, for example). As provided in the illustrated embodiment of FIG. 2, the electronic device(s) 12 may include a cellular telephone, however, any electronic device 12 structured and configured to be charged or powered by the various embodiments disclosed herein is contemplated, including, but certainly not limited to music devices, mp3 players, tablet computers, game consoles, home or consumer products such as electric kettles, rice cookers, toasters, blenders, slow cookers, etc.

Furthermore, in certain embodiments, the pads or bases 20 of the present invention are configured to provide power to or charge the one or more electronic devices 12 via wireless charging technology, including, for example, inductive wireless charging, inductive electric power transfer, electromagnetic induction, etc. The assembly 10 of the various embodiments may therefore implement or use the Qi interface standard for inductive electrical power transfer, or other standards, protocols or implementations.

In particular, the bases or pads 20 of one embodiment each comprise a power transmitter, transmitting coil or inductive power module (not shown) which is structured to provide or generate inductive power. Consequently, the electronic devices 12 of certain embodiments may comprise a power receiver and/or receiving coil (not shown) which is cooperatively structured to consume inductive power, and specifically, the inductive power provided by the transmitting coil of the base 20. In this regard, when an electronic device 12 is disposed on or proximate the charging or interface surface 22 of one or more of the charging bases or pads 20, the base or pad 20 is structured to provide inductive power via the power transmitter and charge the electronic device 12 via electromagnetic induction. Other embodiments and charging implementations are contemplated within the spirit and scope of the present invention.

Additionally, at least one embodiment of the present invention further comprises an attachment assembly 30 which is structured to facilitate disposition the various charging pads or bases 20 in a removably interconnected relation with one another. Specifically, adjacently disposed bases 20 of one embodiment comprise cooperatively structured attachment edges 24 and/or cooperatively structured attachment assemblies 30 which allow a user to easily interconnect one or more bases 20 in any customized fashion or manner. In particular, each of the bases 20 of at least one embodiment comprises a plurality of attachment edges 24 wherein each of the attachment edges 24 may interconnect with attachment edges of an adjacent base.

As just an example, the bases 20 may be configured in the general shape of a square or rectangular, meaning that each base 20 includes four attachment edges 24. In this regard, the modular wireless charging station or assembly 10 of the various embodiments of the present invention includes a plurality of bases or pads 20 which may be arranged or positioned in a customized interconnected relation to form a charging assembly 10 of virtually any size, shape or configuration. Particularly, the attachment assemblies 30 may be used to selectively attach adjacent bases 20, as desired. For instance, while a single base 20 may include a plurality of attachment assemblies 30, one, some or all of the attachment assemblies 30 may be interconnected with an adjacent base 20, as desired or as constructed by the user.

In certain embodiments, the charging or interface surface 22 of the bases 20 comprise a generally flat planar configuration, which facilitates implementation of the present invention by allowing an electronic device 12 to be easily placed thereon. Accordingly, when multiple bases 20 are conjoined or interconnected with one another, as illustrated in FIGS. 1 through 4, a collective, generally flat planar charging surface is created or assembled. This allows a user to customize the general size, shape and configuration of the collective assembly 10 and the collective charging surface thereof. Further, in certain embodiments, with the attachment assemblies 30 disposed on the edges thereof, the top, upper or charging surface 22 created by adjacently disposed bases 20 may be continuous from edge to edge.

Similarly, the bases 20 of one embodiment comprise a generally flat, planar bottom surface to allow the bases 20 to be disposed or placed on a flat supporting surface, such as a desk, counter top, etc. In such a manner, the bases 20 may comprise a flat rectangular or square shaped configuration, similar to the shape of a floor tile. The bases 20 may therefore be easily interconnected with one another along the adjacent attachment edges 24 and/or attachment assemblies 30, as described. Other configurations, shapes and sizes of the bases 20 are also contemplated, and therefore, the top surface and bottom surface need not comprise a generally flat planar configuration for the invention to be implemented in its intended manner. Rather, any rounded, curved, sloped or other configuration is also contemplated.

Figure 3:
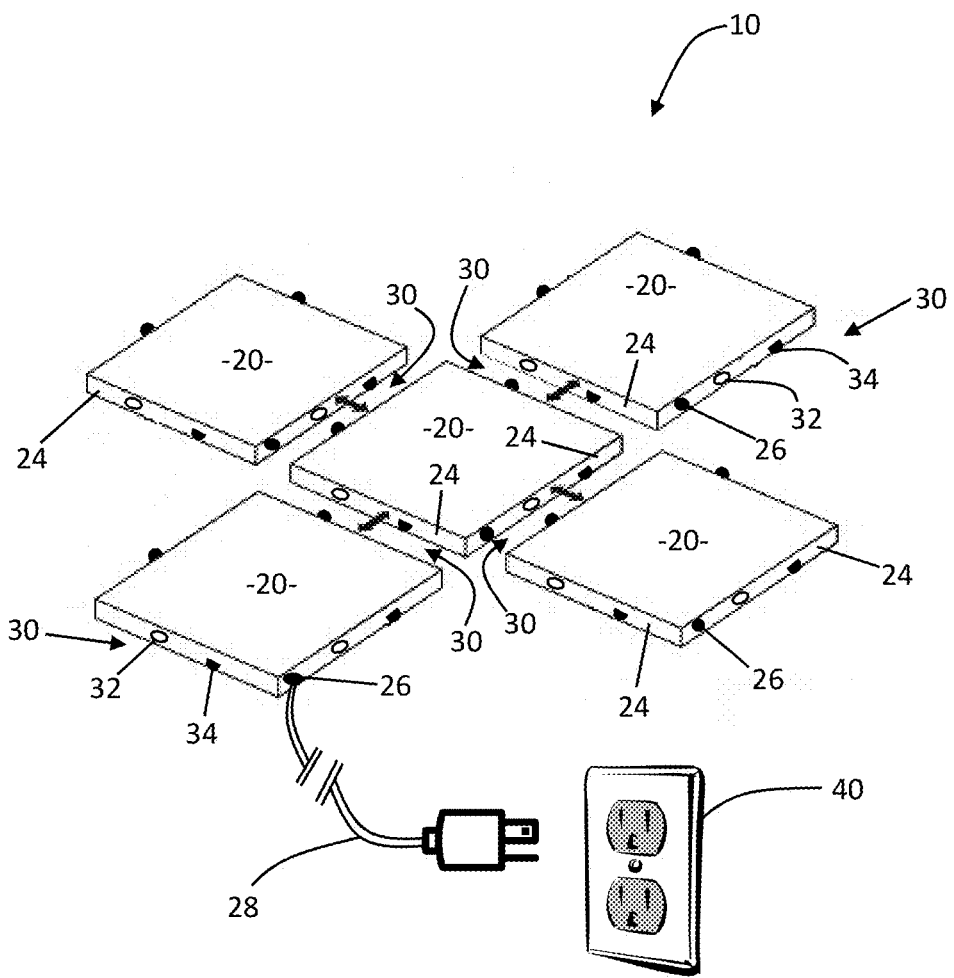
FIG. 3 is an exploded view of the wireless charging station and assembly comprising a different configuration as that illustrated in embodiment of FIGS. 1 and 2.
Figure 4:
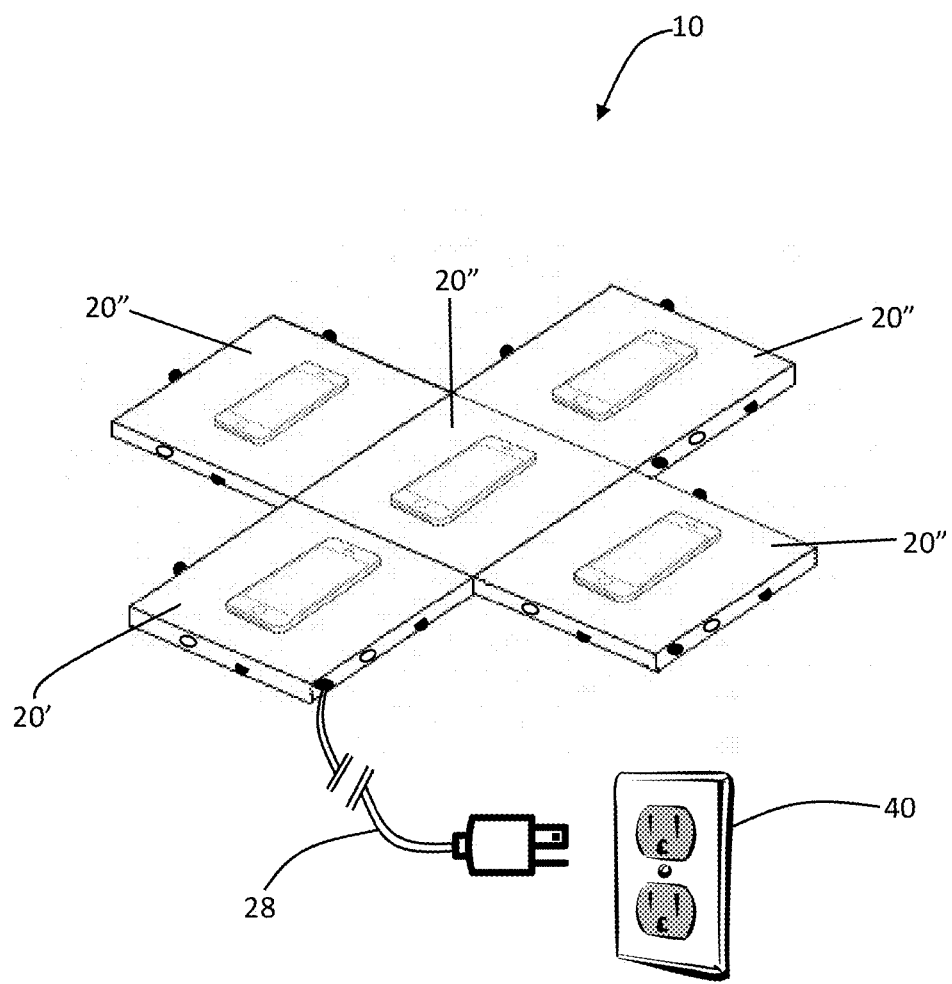
FIG. 4 is a schematic representation of the assembled wireless charging station and assembly illustrated in the embodiment of FIG. 3.

As one example, FIGS. 1 and 2 illustrate a three (3) by three (3) grid of interconnected charging pads or bases 20 to form a nine (9) tile assembly 10. FIGS. 3 and 4 illustrate another assembled configuration of five (5) pads 20 in the shape of a plus sign (+). Of course, the figures are representative of exemplary configurations only, and it should be apparent that virtually any configuration, whether symmetrical, asymmetrical, oblong, rectangular, etc. is contemplated.

Furthermore, the attachment assemblies 30 of the various embodiments of the present invention may include any structure or device configured to allow a user to easily interconnect the various pads or bases 20 to one another, for example, via attachment edges 24 of adjacent pads 20. In particular, in at least one embodiment, the attachment assemblies 30 may include, but are certainly not limited to, cooperatively structured and disposed clips, snaps, clasps, brackets, sockets, magnets, notches, prongs, electrical connections, etc. Referring to the embodiment illustrated in FIG. 3, the attachment assemblies 30 include cooperatively structured sockets 32 and notches 34 disposed on attachment edges 24 of the various charging pads or bases 20. In this manner, a notch 34 of one base 20 is structured to interconnect with a cooperatively disposed socket 32 of an adjacently disposed base 20. As mentioned herein, other attachment assemblies 30 are contemplated within the intended implementation and spirit and scope of the present invention. With the attachments assemblies 30 disposed on the attachment edge 24 of the pad or base 20, when interconnected with adjacent bases the collective interface surface 22 remains generally flat or continuous and is not obstructed by the attachment assembly 30.

Moreover, the various embodiments of the present invention comprises a power source configured to deliver or supply power to the plurality of charging pads or bases 20 of the wireless charging station and assembly 10. Specifically, at least one embodiment comprises an external power source, including but not limited to a standard AC (Alternating Current) power supply or outlet, DC (Direct Current) power supply or outlet, external or internal battery or batteries, etc. In such an embodiment, at least one of the pads or bases 20 includes a power source input or socket 26 connectable to the power source, for example, via a power cable or cord 28.

In yet another embodiment, however, the power source may be disposed internally to the pads or bases 20, and may therefore include one or more batteries, or battery packs, whether disposable, rechargeable, removable, or semi-permanent. In particular, the batteries or other internal power source(s) may be recharged in one embodiment via connection of the pads or bases 20 to an external power source 40.

Referring now to FIG. 4, at least one embodiment of the wireless charging station and assembly 10 of the present invention comprises at least one power source charging base 20' and at least one, but more practically, a plurality of power dependent charging bases 20". In particular, the power source charging base 20' is directly connected to the power source 40, whether external, as depicted, or internal via one or more batteries or otherwise. The power dependent charging bases 20" are cooperatively structured to receive power transmitted through or from the interconnected power source charging base 20'. Accordingly, in one embodiment, a plurality of interconnected bases or pads 20 assembled to collectively create a wireless charging station or assembly 10 need only be connected to a single power source 40 via one of the plurality of pads or bases 20, e.g., the power source charging base 20'. The other remaining pads or bases 20" can therefore receive power via the interconnection between the various adjacently disposed pads or bases 20. In this regard, each of the pads or bases 20 receive sufficient power to operatively charge one or more electronic devices 12 disposed on the charging or interface surface 22 via wireless charging technology, including but not limited to inductive wireless charging, inductive electric power transfer, electromagnetic induction, as provided herein.

In particular, the attachment assemblies 30 of at least one embodiment may be structured and configured to transmit or communicate power between adjacently interconnected pads or bases 20 in order to distribute the power from at least one pad or base 20 (e.g., the power source charging base 20') to the other interconnected pads or bases 20 (e.g., the power dependent charging bases 20"). Accordingly, in one embodiment, the attachment assemblies 30 may include, but are certainly not limited to power transfer terminals, prongs or sockets cooperatively structured to removably interconnect adjacent pads or bases 20 and/or to share or communicate power there between. Of course, the attachment assemblies 30 and power communication connections may, in certain embodiments, be separate from one another.

Figure 5:
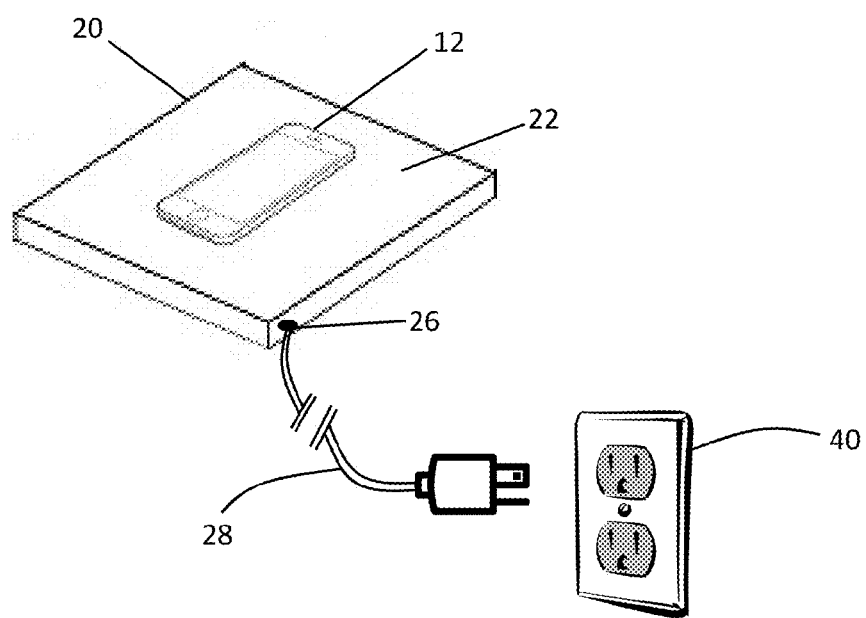
FIG. 5 is a wireless charging pad or base of at least one embodiment of the present invention.

It should also be noted that, in certain embodiments of the present invention, each individual pad or base 20 can be operative independently or otherwise in an independent, non-interconnected or disconnected use or orientation. In this manner, as represented in FIG. 5, each of the wireless charging pads or bases 20 of the present invention may be connected to or include an external power source 40 and operatively charge one or more electronic devices as a stand-alone or independent charging pad or base 20. Although not shown, the pads or bases 20 may include an internal power source, such as one or more batteries or battery packs, and may thus operate in the independent, disconnected orientation without connection to an external power source 40. In either event, the pads or bases 20 may therefore be selectively disposed between an independent, disconnected use or orientation (FIG. 5) and an interconnected use or orientation (FIG. 4) as desired. In such a manner, a user may selectively disconnect one or more bases 20 from the assembly and use the disconnected base 20 alone or by itself. Advantageously, the user may simply take one or more bases 20 with him or her when travelling, going to work, or simply moving from one location to another. The disconnected base 20 may be reconnected to the assembly and selectively function or operate in the interconnected manner as described herein.

For instance, a user may have a plurality of bases 20 interconnected to one another at home, for example, with at least one of the interconnected bases 20 connected to a power outlet or other power source. If desired, the user may disconnected one of the bases 20 (for example, a power dependent base 20") and take it with him or her. In certain embodiments, the base(s) 20 includes an internal (or other) battery which may have been charged when interconnected to the other bases at home. Thus, the disconnected base 20 may be used as portable power (without the need to connected to another power source) via the charged battery, for example. When the user returns to the main assembly 10, he or she can re-connect the disconnected base 20, where it will, again, recharge. As should be apparent, while connected to the assembly 10 and recharging, the bases 20 may be used to transfer power to an electronic device.

In this regard, the bases 20 may be used to charge an electronic device whether the base 20 is disposed in the interconnected orientation or the disconnected, independent orientation. The power source may be from an external power supply or source (e.g., an outlet) or in independent power source (e.g., a battery connected to the particular base).

Figure 6:
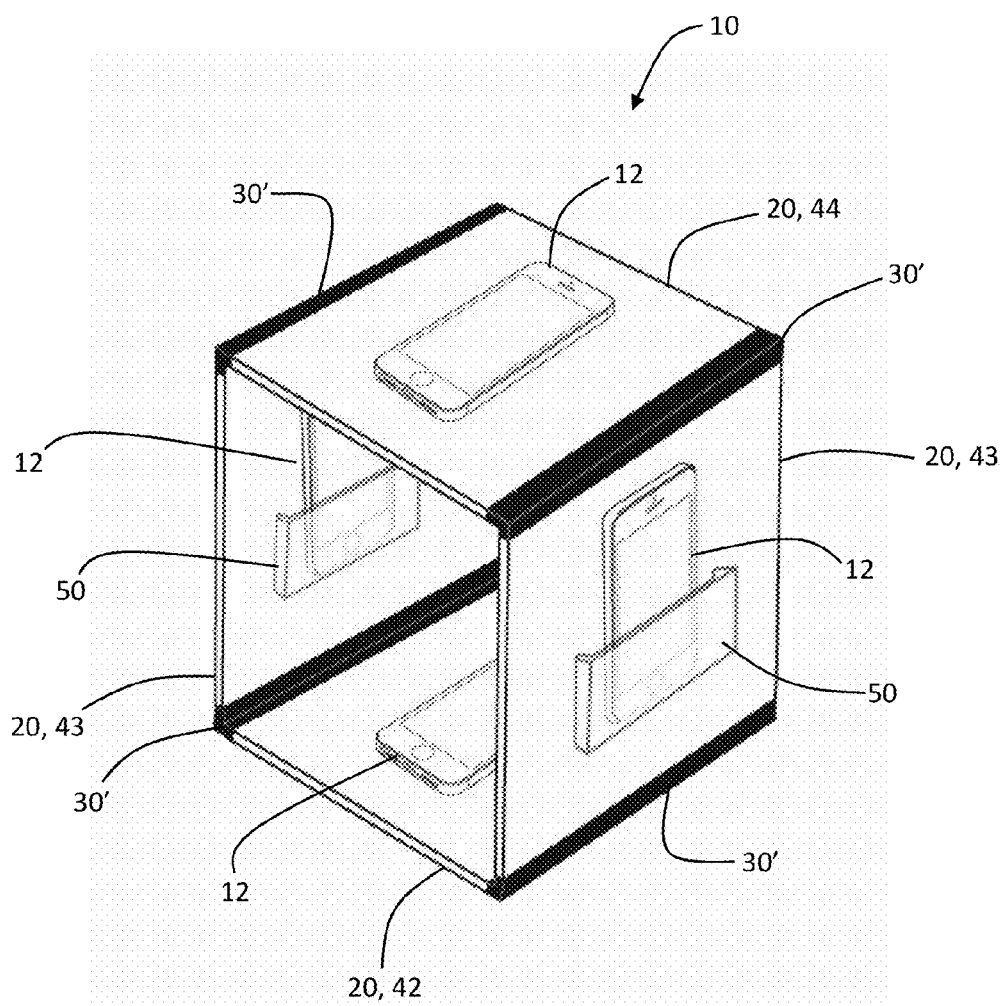
FIG. 6 is a perspective view of yet another embodiment of the wireless charging station and assembly of the present invention.

In yet another embodiment, as illustrated in FIG. 6, the bases or pads 20 of the assembly 10 may be configured or interconnected with one another in a manner to construct or otherwise represent a box-like housing or assembly, although other configurations are contemplated. In this manner, the assembly of such an embodiment comprises a bottom or support pad 42, one or more side pads 43 and an upper or top pad 44. In at least one embodiment, the pads or bases 42, 43, 44 are removably, pivotally or movably interconnected with one another via cooperatively attachment assemblies 30'. It should be noted, that the attachment assemblies 30' of the embodiment of FIG. 6 may include a substantially permanent interconnection between adjacent bases and/or a hinged or other movable interconnection there between, In particular, the attachment assemblies 30' of the embodiment illustrated in FIG. 6 may include any structures or devices configured to implement the invention in the intended manner. As such, the attachment assemblies 30' may include prongs, clips, snaps, slidable engagements etc. structured to removably, pivotally and/or movably interconnect adjacent pads 42, 43, 44. Particularly, the attachment assemblies 30' may also or instead include removable, pivotal or movable rods which interconnect with prongs, clips, snaps, etc. disposed on attachment edges of each of the corresponding bases 42, 43, 44. Certain embodiments may also include detachable hinge-like structures to facilitate attachment and pivotal movement of adjacent pads. Particularly, the bases 20 and attachment assemblies 30' may include cooperatively structured grooves, snaps or clips, allowing the bases 20 to easily slide, snap or clip into an attached relation with one another or the attachment assemblies 30'. It should also be noted that in one embodiment, the bases 20 are permanently secured or attached to the attachment assembly 30'.

Furthermore, still referring to FIG. 6, one or more of the bases 20 may include a support structure 50 in order to support an electronic device 12 therein or thereon. In particular, the support structure 50 may be in the form of a pocket (as shown in FIG. 6), a ledge, one or more straps, or securing devices to support or maintain the electronic device 12 in the desired position relative to the base or pad 20. Specifically, the support structure 50 may be disposed on the one or more side bases or pads 43, which in at least one embodiment may be disposed in an at least partially vertically oriented position. Accordingly, the electronic device 12 may be positioned on or in the support structure 50 (as shown in FIG. 6), in order to maintain the device 12 in the charging position relative to the charging/interface surface of the corresponding base 20.

Figure 7A:
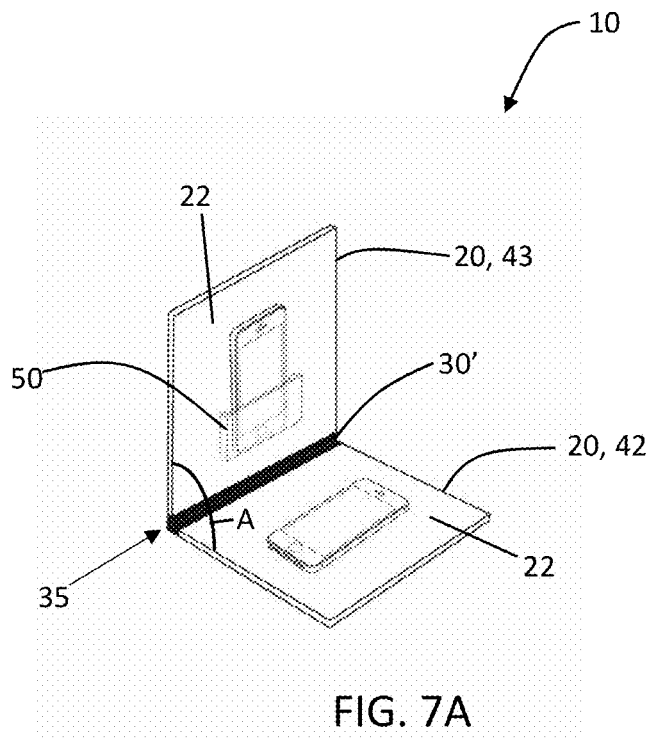
FIGS. 7A and 7B are perspective views of yet another embodiment of the wireless charging station and assembly as disclosed herein.
Figure 7B:
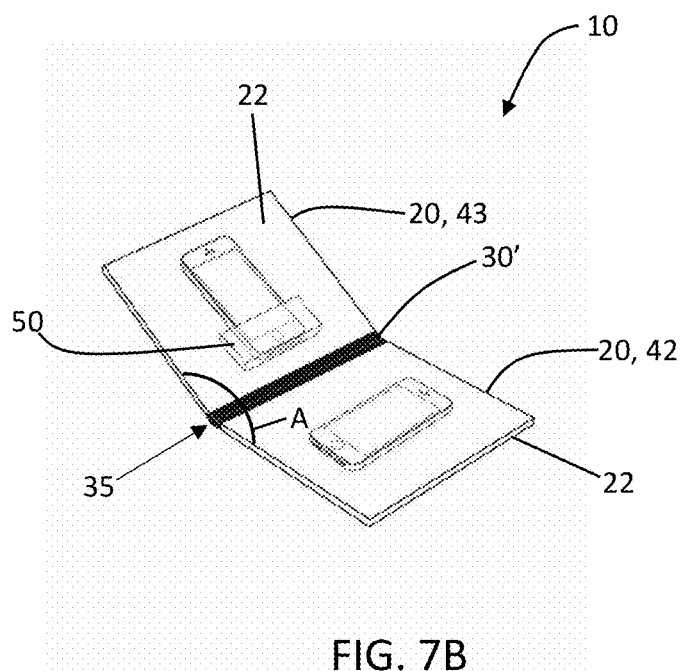

Referring now to the embodiment illustrated in FIGS. 7A and 7B, the attachment assembly 30' may further comprise a hinge-like or other movable or pivotal structure capable of positioning the attached bases 20 in various inclined or angled orientations relative to one another. Accordingly, the attachment assembly 30' may comprise a pivot point or axis 35 about which the attached pads 20 may pivot or be disposed. Particularly, the attachment assembly 30' of such an embodiment may be structured in a manner such that the angle A measured between interface surfaces 22 of adjacently attached bases 20 may be virtually any angle, including a right angle or 90 degrees (as illustrated in FIG. 7A), an obtuse angle (as illustrated in FIG. 7B) or an acute angle (not illustrated).

It should also be noted that the attached bases 20 may, in certain embodiment, be removably attached to one another or permanently attached or interconnected to one another. For example, the bases 20 may be removably attached to the attachment assembly 30' such that each of the bases 20 and the attachment assembly 30' may be removed, disconnected and/or interconnected with one another as desired. In another embodiment, however, the attachment assemblies 30' may be secured to the bases 20, but removably interconnected with one another, for example, at or near pivot point 35. In other embodiments, the bases 20 and attachment assemblies 30' are permanently, yet movably/pivotally interconnected to one another.

Figure 8A:
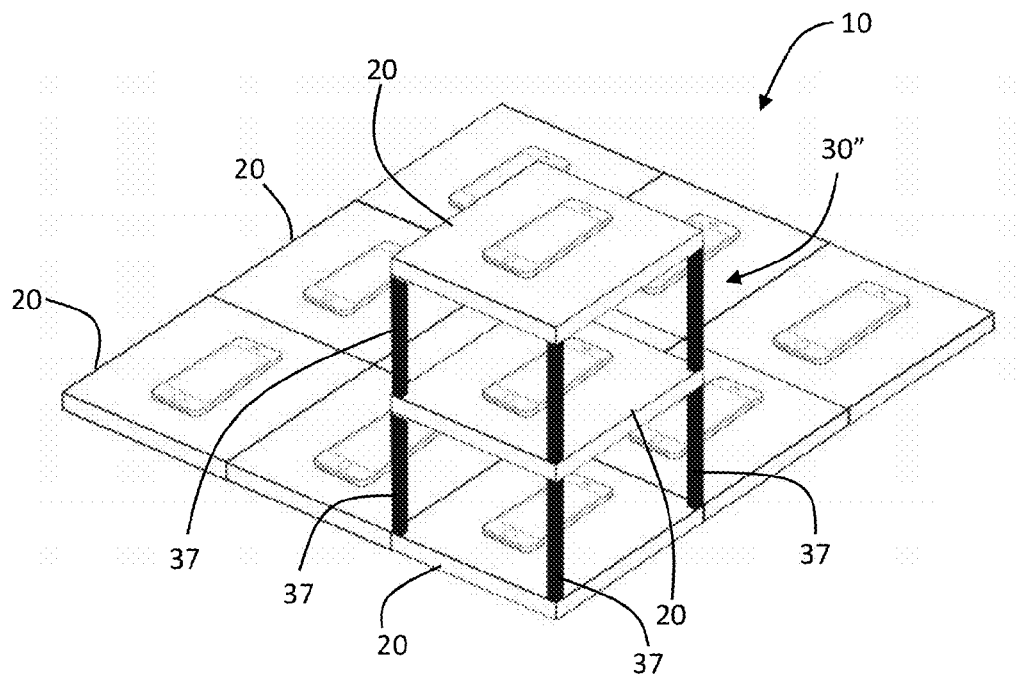
FIGS. 8A and 8B are perspective views of another embodiment of the wireless charging station and assembly as disclosed herein.
Figure 8B:
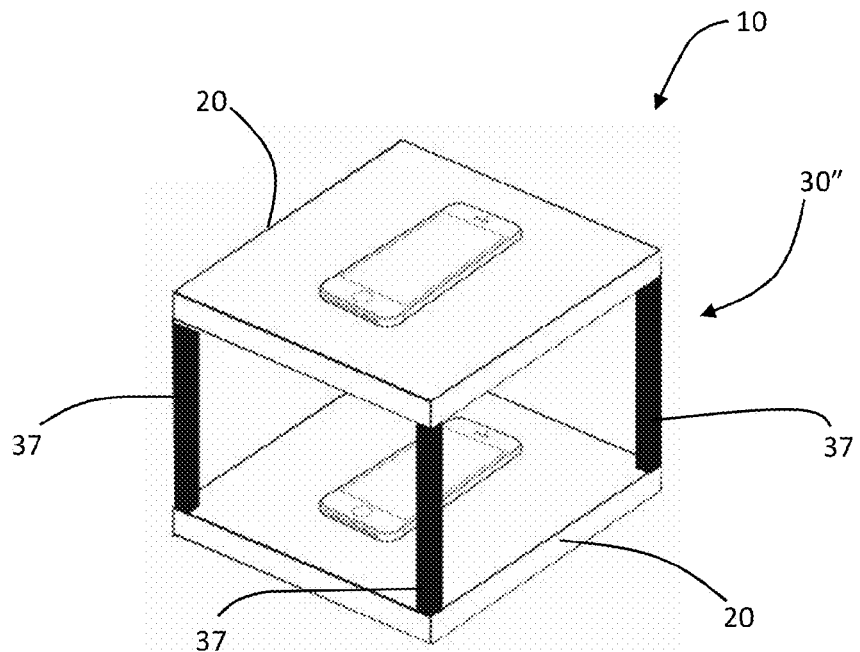

In yet another embodiment, the bases 20 may be positioned in an at least partially vertically stacked or aligned relation to one another, as illustrated in FIGS. 8A and 8B. In particular, the attachment assembly 30" of such an embodiment comprises at least one, but more practically, a plurality of vertical supports 37 cooperatively structured to position the attached bases 20 in the substantially vertically aligned or stacked relation to one another. Accordingly, the support 37 may be constructed in the form of support poles, rods or columns, although other configurations structured to orient the bases 20 in a vertically stacked portion with one another is contemplated.

Furthermore, the supports 37 of at least one embodiment are structured to communicate or transmit power from one base 20 a second attached base. In particular, the attachment assemblies 30, 30' and 30" of the various embodiment described herein may each be configured to communicate or transmit power from one base to an adjacent or interconnected bases. Accordingly, only one of the plurality of attached bases 20 needs to be connected to or otherwise include a power source, in that the power from the powered base will be communicated to the remaining power dependent bases, for example, via the attachment assembly 30, 30', 30".

The foregoing description and accompanying drawings of the present invention are presented for purposes of illustration and description. They are not intended to be exhaustive or to limit the invention in any manner, and many modifications and variations are possible. It is intended that the scope of the invention be defined by the claims appended hereto and their equivalents.

Now that the invention has been described,

What is claimed is:
1. A modular wireless charging assembly, comprising:
 a plurality of wireless charging bases each selectively disposable between an interconnected orientation and a disconnected, independent orientation,
 at least one vertically oriented attachment assembly for selectively disposing at least two of said plurality of wireless charging bases in a vertically oriented interconnected relation with one another, said vertically oriented interconnected relation defining a vertical space between said at least two of said plurality of wireless charging bases, wherein at least one electronic device is disposable within said vertical space, and
 at least one planar attachment assembly for selectively disposing said at least two of said plurality of wireless charging bases in a planar interconnected relation, wherein said planar attachment assembly is structured to allow at least some of said plurality of wireless charging bases to be interconnected with one another in at least two different horizontal directions,
 wherein at least one of said plurality of wireless charging bases is structured to wirelessly charge an electronic device disposed on a corresponding charging surface thereof when said wireless charging base is disposed in said interconnected orientation with another one of said plurality of wireless charging bases, and when said wireless charging base is disposed in said disconnected, independent orientation.

2. The modular wireless charging assembly as recited in claim 1 wherein said plurality of wireless charging bases comprise an inductive wireless charging module.

3. The modular wireless charging assembly as recited in claim 1 wherein each of said plurality of wireless charging bases are structured to wirelessly charge the electronic device while disposed in said interconnected orientation and said disconnected, independent orientation.

4. The modular wireless charging assembly as recited in claim 3 wherein each of said plurality of wireless charging bases comprise a power source independently associated therewith.

5. The modular wireless charging assembly as recited in claim 4 wherein each of said plurality of wireless charging bases are independently connectable to an external power source.

6. The modular wireless charging assembly as recited in claim 5 wherein said plurality of wireless charging bases are disposed in an electrically coupled relation with one another while disposed in said interconnected orientation.

7. The modular wireless charging assembly as recited in claim 6 wherein at least one of said plurality of wireless charging bases comprises a power source charging base connected directly to the external power source, and at least one different one of said plurality of wireless charging bases comprises a power dependent charging base.

8. The modular wireless charging assembly as recited in claim 7 wherein said power dependent charging base comprises a power input from an adjacently interconnected charging base.

9. The modular wireless charging assembly as recited in claim 1 wherein adjacently disposed wireless charging bases positioned in said planar interconnected relation define a continuous, collective charging surface thereon.

10. The modular wireless charging assembly as recited in claim 1 wherein at least two of said plurality of interconnected wireless charging bases are movably disposed relative to one another via a corresponding attachment assembly.

11. The modular wireless charging assembly as recited in claim 10 wherein said at least two interconnected wireless charging bases are pivotally interconnected to one another via said corresponding attachment assembly.

12. The modular wireless charging assembly as recited in claim 11 wherein said at least two interconnected wireless charging bases are selectively positionable in an angular relation to one another via said corresponding attachment assembly.

13. The modular wireless charging assembly as recited in claim 1 wherein said vertically oriented attachment assembly is structured to dispose said at least two of said plurality of interconnected wireless charging bases in an at least partially vertically aligned relation with one another.

14. The modular wireless charging assembly as recited in claim 13 wherein said vertically oriented attachment assembly comprises vertically oriented support members.

15. A modular wireless charging assembly, comprising:
a plurality of wireless charging bases each selectively positionable into a plurality of interconnected orientations with at least another one of said plurality of wireless charging bases,
at least one attachment assembly structured to selectively dispose said plurality of wireless charging bases into said plurality of interconnected orientations, said plurality of interconnected orientations comprising a stacked interconnected orientation and a planar interconnected orientation,
said stacked interconnected orientation defines a space between a lower one of said plurality of wireless charging bases and an upper one of said plurality of wireless charging bases, wherein at least one electronic device is disposable within said space,
said planar interconnected orientation being defined as at least two of said plurality of wireless charging bases being selectively interconnected to one another in a horizontal direction,
said plurality of wireless charging bases being disposed in an electrically coupled relation with one another while disposed in said interconnected orientation, and
wherein said plurality of wireless charging bases are each structured to wirelessly charge an electronic device when said plurality of wireless charging bases are disposed in at least one of said plurality of interconnected orientations.

16. The modular wireless charging assembly as recited in claim 15 wherein said plurality of wireless charging bases are disposed in an electrically coupled relation with one another via said attachment assembly while disposed in said interconnected orientation.

17. The modular wireless charging assembly as recited in claim 15 wherein said at least one attachment assembly is structured to allow at least some of said plurality of wireless charging bases to be interconnected with one another in at least two different horizontal directions.

18. The modular wireless charging assembly as recited in claim 15 wherein said at least two interconnected wireless charging bases are selectively positionable in an angular relation to one another via said corresponding attachment assembly.

19. The modular wireless charging assembly as recited in claim 15 wherein at least two of said plurality of interconnected wireless charging bases are disposed in an at least substantially vertically aligned relation with one another via a corresponding attachment assembly.

20. A modular wireless charging assembly, comprising:
a plurality of wireless charging bases each selectively positionable into an interconnected orientation with one another,
at least one attachment assembly structured to selectively dispose said plurality of wireless charging bases into said interconnected orientation,
said interconnected orientation defined as comprising an elevated interconnected orientation comprising an elevated space between an upper surface of one of said plurality of wireless charging bases and a lower surface of another one of said plurality of wireless charging bases, wherein at least one electronic device is disposable within said space, and
wherein said plurality of wireless charging bases are each structured to wirelessly charge an electronic device when said plurality of wireless charging bases are disposed in said interconnected orientation.

* * * * *